United States Patent Office 3,049,506
Patented Aug. 14, 1962

3,049,506
LOW MOLECULAR WEIGHT POLYESTERS OF 1,4-CYCLOHEXANEDIMETHANOL AND POLYVINYL CHLORIDE PLASTICIZED THEREWITH
Charles J. Kibler, Alan Bell, and James G. Smith, Kingsport, Tenn., assignors to Eastman Kodak Company, Rochester, N.Y., a corporation of New Jersey
No Drawing. Filed June 29, 1959, Ser. No. 823,297
18 Claims. (Cl. 260—45.4)

This invention relates to low molecular weight linear condensation polymers of at least two constituents as follows: 1,4-cyclohexanedimethanol (cis or trans isomers), a dicarboxylic acid and optionally a chain terminating monofunctional compound selected from the group consisting of monobasic acids and monohydric alcohols. These polymers are useful as plasticizers, synthetic lubricants, etc. and are characterized by excellent overall properties including stability at high temperatures, hydrolytic stability, etc.

This application is related to Kibler et al. Serial No. 554,639, filed December 22, 1955, now U.S. Patent No. 2,901,466, granted August 25, 1959, wherein the claims cover polyesters generically as well as polyester-amides wherein one of the constituents is a diamine. Kibler et al. Serial No. 823,298 filed on even date herewith covers polymers wherein one of the principal constituents is a hydroxycarboxylic acid. Kibler et al. Serial No. 823,296 filed on even date herewith covers polymers wherein one of the principal constituents is an aminoalcohol. Kibler et al. Serial No. 823,295 filed on even date herewith covers polymers wherein one of the principal constituents is an aminocarboxylic acid. The specification and file history of the Kibler et al. application Serial No. 554,639 discusses the prior art and the unobviousness of the subject matter of these inventions.

The properties of the polymers of the present invention include unexpectantly superior stability at high temperatures, chemical stability, physical stability, etc. More specific properties include weather resistance, hydrolytic stability which is an important factor in weathering, etc.

The objects of the present invention include providing polymers of the components mentioned above having the advantageous properties enumerated as well as products produced therefrom as described. Other objects will become apparent elsewhere herein.

According to a preferred embodiment of this invention polymers are provided which are linear chain-terminated condensation polymers of (A) at least one dibasic carboxylic acid, (B) at least one bifunctional dihydroxy compound, and (C) at least one member selected from the group consisting of monobasic acids and monohydric alcohols, the relative proportions of (A), (B) and (C) constituents being such as to constitute a polymer having a molecular weight of from about 800 to 4,000 in which at least 50 mole percent of said constituent (B) consists of at least one member selected from the group consisting of the cis and trans isomers of 1,4-cyclohexanedimethanol.

The bifunctional reactants or constituents which are employed to prepare the polymers of this invention contain no other reactive (functional) substituents which would interfere with the formation of linear polymers as defined by Carothers in his earlier work in this field. Such bifunctional reactants and the methods for preparing polymers from them are well known in the art and illustrated in numerous patents and in the literature as well as in the parent patent application of which this is a continuation-in-part.

As used in this specification the term 1,4-cyclohexanedimethanol includes either or a mixture of both cis and trans isomers. The preferred usage is at least 50 percent of the trans isomer. The letters CHDM have the same meaning. A useful mixture of isomers is about 70% trans plus 30% cis.

Examples of the constituents which constitute the polymers of this invention include constituents designated above as (A), (B) and (C), as follows:

(A) DIBASIC CARBOXYLIC ACIDS

These include most preferably the aliphatic acids but may include minor amounts of aromatic, heterocyclic and other types and include cycloaliphatic, acyclic, hexacarbocyclic, tetracarbocyclic, bicyclic, etc. Examples include cyclohexanedicarboxylic, succinic, norcamphanedicarboxylic, dimerized fatty acids, trimerized fatty acids, suberic, azelaic, adipic, sebacic, glutaric, dimethylmalonic, 2-ethylsuberic, oxalic, 2,2-diethyladipic, dicarboxy diethyl ether, ortho-phthalic, hexahydro-o-phthalic, sulfonyldipropionic and many other such acids. The especially preferred aliphatic dicarboxylic acids are those having from 4 to 40 carbon atoms.

(B) DIHYDROXY COMPOUNDS

These include most preferably aliphatic glycols but may include minor amounts of other types as in regard to constituent (A). Preferably the hydroxy radicals are attached to a methylene group as in a glycol, i.e., the compound is a dihydroxymethyl compound such as ethylene glycol, 1,10-decanediol, neopentyl glycol, 1,4-bishydroxymethylbenzene, norcamphanedimethanol, etc. Other dihydroxy compounds include hydroquinone, dihydroxynaphthalene, resorcinol, etc. Such compounds generally contain from 2 to 20 carbon atoms if they are monomeric in nature; however, the dihydroxy compounds contemplated also include the polyethylene glycols, other low polymers which are bifunctional and may contain internal ether, thioether, sulfone, carboxy, urethane and other linkages. Additional specific examples include 2-methyl-1,5-pentanediol, diethylene glycol, triethylene glycol, 2,2-dimethyl-3-isopropyl-1,3-propanediol, etc. The especially preferred dihydroxy compounds are aliphatic glycols having from 2 to 40 carbon atoms.

As already pointed out constituent (B) is composed of at least 50 mole percent of CHDM, whereby the advantageous results of this invention are accomplished.

(C) MONOBASIC ACIDS

These include aromatic, aliphatic, heterocyclic and other types as in regard to constituent (A) and are preferably aliphatic acids having 4 to 40 carbon atoms, e.g. 2-ethylhexanoic acid, pelargonic acid, neo-fat acids, caproic acid, etc.

(C) MONOHYDRIC ALCOHOLS

These include aromatic, aliphatic, heterocyclic and other types as in regard to constituent (A) and are preferably aliphatic alcohols having from 4 to 20 carbon atoms, e.g. 2-ethylhexanol, 2,2-dimethylpentanol, 2,2,4-trimethylpentanol, lauryl alcohol, decanol, etc.

The molar proportions of the various constituents in the polymers of this invention are apparent to those skilled in the art. Generally speaking there are equal molar proportions of (1) the A constituent and (2) the B constituent. The sum total of the molar quantities of the various constituents will depend upon the method of preparation. The art is replete with such disclosures. A copending application by co-workers in the same laboratories with the inventors discusses this in great detail, viz. Caldwel Serial No. 662,972, filed June 3, 1957.

The products of this invention can be divided into classes depending upon the manner in which these polyester products are produced:

(1) Polyesters made of A and B constituents by using excess bifunctional dicarboxylic compounds (A constituent).

(2) Polyesters made of A and B constituents by using excess glycol, especially CHDM, and (3) Polyesters made so as to incorporate a chain-stopping monohydric aliphatic alcohol or monobasic acid (C substituent).

According to this invention the polyester produced is characterized in that exposure to water for 96 hours at about 100° C. produces substantially no hydrolytic deterioration and the polyester is useful as a plasticizer for cellulose esters and polymeric vinyl compounds producing plasticized plastic compositions having exceptionally high hydrolytic stability and plasticizer permanence.

In general, compositions which are prepared according to this invention have an optimum chain length. Thus, the molecular weight of such polyesters is high enough to prevent loss of such polyesters from plastic compositions resulting from volatility or extraction but the molecular weight is not too high for good compatibility with the plastic composition. Those cases involving the preparation of mixed polymeric plasticizers should not contain more than up to about 30 mole percent of another dicarboxylic bifunctional compound of either aliphatic or aromatic character. The same limitation is preferably applied to the employment of mixtures of glycols which contain glycols other than CHDM.

The polymeric plasticizers can be advantageously made by ester interchange between the glycol and a lower alkyl ester of the dialkylmalonic acid. Any of the known ester interchange catalysts useful in the preparation of polyesters can be employed as described in the copending Kibler et al. application Serial No. 554,639 which describes the high molecular weight polyesters. The reaction is heated and stirred advantageously at 120°–200° C. under conditions that allow the alcohol to distill from the reaction vessel. The reaction can then be completed to the desired degree of polymerization by the employment of reduced pressure. In order to obtain a polyester useful as a plasticizer having optimum stability, it is usually preferable to remove the catalyst at the end of the reaction. This can be done when an acid catalyst such as toluene sulfonic acid is employed by washing with a dilute solution of sodium carbonate. When an alkaline catalyst such as calcium oxide is used, it can be neutralized by adding acetic acid to the product and filtering off the calcium acetate. Alternatively, the catalyst may be removed by washing with a dilute acid solution.

The process for preparing the liquid low-molecular weight polyesters (non-terminated) of the present invention differs from the process employed in the preparation of the fiber and film-forming polyesters described in the copending Kibler et al. application Serial No. 554,639 primarily in the fact that the reaction is conducted under conditions that leave in the reaction product of the present invention a molar excess in the range of from 10–50 percent and preferably in the range of 20–40 percent of either the dicarboxylic component or the glycol component. By employing such conditions, it is not possible for the final product to acquire that high degree of polymerization useful in fiber and film-forming polyesters which are produced by conducting the reaction under conditions that distill out the components in excess (usually the glycol) and promote the formation of a highly polymeric product that contains essentially a 1:1 molar ratio of the two reactants.

The products of a preferred aspect of the instant invention have a maximum molecular weight of about 2,500 to 4,000 and in many cases the molecular weight is less than 1000 whereas the minimum molecular weights required for the production of fibers and films is about 10,000–12,000. The products of the present invention are useful plasticizers compatible with a wide variety of plastic compositions such as cellulose derivatives, vinyl polymers, phenolic resins, alkyd resins, etc. whereas the film and fiber-forming polymers are generally incompatible and tend to crystallize out of mixtures. The products of the present invention generally melt well below 100° C. and in most cases melt below 40°–60° C., whereas the fiber and film-forming polyesters melt at temperatures well above 100° C. approaching 200° C. or much higher.

The products of the present invention can be made by using and maintaining during the course of the reaction a definite excess of one of the reactants (especially constituent C) which acts as a chain terminator. The final product has a substantially constant composition regardless of the reaction time or temperature and as a result the molecular weight can be controlled within close limits. It has been found that optimum plasticizing properties are obtained only within a certain range of molecular weights or chain length ranges. If the chain length is too great, the polyester becomes less compatible while if the chain length is too short, the polyester is more volatile and can be somewhat extracted by water and solvents.

The excellent characteristics of the plasticizers of the present invention in regard to water extraction can be measured in accordance with ASTM procedure D–1239 and the characteristics pertaining to loss of volatility by ASTM procedure D–1203. The extent of hydrolysis of the plasticizers of this aspect of the invention can be determined by boiling the plasticizer in water for 96 hours and titrating the free acid.

The polymeric plasticizers of this invention are viscous liquids or waxy solids that are soluble in common solvents such as benzene, toluene, the lower alcohols, ketones, esters, chlorinated hydrocarbons, etc.

These polymeric plasticizers are of particular value as plasticizers for polyvinyl chloride and interpolymers of vinyl chloride with vinylidene chloride, vinyl acetate, acrylonitrile, vinylidene cyanide, isopropenyl acetate, etc. These polymeric plasticizers are also useful in cellulose acetate, cellulose triacetate, cellulose propionate, cellulose acetate-butyrate, cellulose butyrate, etc.

These polymeric plasticizers can also be used in combination with other plasticizers including those described in this specification as well as other polymeric ester plasticizers known in the art or with monomeric plasticizers known in the art. These plasticizers can be incorporated with the resinous compositions to be plasticized by the usual rolling and mixing methods. They may also be added to solutions or dopes prior to extrusion or casting.

Although it is not necessary to use a chain-stopping agent such as a monohydric alcohol, the preparation of chain-stopped polyesters is primarily contemplated within the scope of this invention since the products have some superior properties and are otherwise essentially analogous to those produced without such chain-stopping agents.

The preparation of the polymers can be accomplished by various other techniques as described in the Caldwell application, in the prior art and in the examples below. The methods for plasticizing cellulose esters, synthetic resins and other products are similarly apparent.

This invention can be further illustrated by the following examples of preferred embodiments, although it will be apparent that these examples are included merely for purposes of illustration and are not intended to limit the scope of the invention unless otherwise specifically indicated:

*Example 1*

A 2-l. flask equipped with stirrer, thermometer, and fractionating column was charged with 282 g. (1.5 moles) of azelaic acid, 173 g. (1.2 moles) of 1,4-cyclohexanedimethanol, 156 g. (1.2 moles) of 2-ethylhexanol and 0.4 ml. of titanium tetraisopropoxide. One hundred milliliters of commercial xylene was then added and the mixture heated with stirring to 160–170° C. At this temperature the xylene refluxed smoothly and the water formed during the esterification codistilled rapidly. Heating was continued for 40 hours, with the occasional addition of 50-ml. portions of xylene to maintain reflux. At the end of this time 56 ml. of water had been collected, and the acid number of the material was 0.09. The reaction was cooled to 50° C. and the pressure reduced to 3 mm. of mercury. The temperature was raised over a 5-hour period to 175° C., during which time the xylene and excess alcohol distilled. After heating and stirring for 15 hours, under vacuum, the reaction product was treated with 10 g. of filter cel and 25 ml. of water for 3 hours at 70° C. and filtered. The final product had a molecular weight of 1161, an acid number of 0.26 and a hydroxyl number of 2.39.

*Example 2*

The molecular weight of the polymeric plasticizers of this invention can be controlled by the ratio of monofunctional to difunctional alcohol. For example, in a manner similar to that of Example 1 a reaction was run using 282 g. (1.5 moles) of azelaic acid, 202 g. (1.4 moles) of 1,4-cyclohexanedimethanol, and 104 g. (0.8 mole) of 2-ethylhexanol and 0.4 ml. of titanium tetraisopropoxide. The product had a molecular weight of 2062, an acid number of 1.02 and a hydroxyl number of 0.24.

*Example 3*

Polymeric plasticizers according to this invention can also be prepared by an alcoholysis reaction between a diol and a dialkyl ester of a dicarboxylic acid. A mixture of 412 g. (1.0 mole) of 2,2,4-trimethylpentyl azelate, 137 g. (0.95 mole) of 1,4-cyclohexanedimethanol, and 0.04 ml. of titanium tetraisopropoxide was placed in a flask equipped with a thermometer, stirrer, and fractionating column. The reagents were stirred and the temperature was slowly raised so as to keep the 2,2,4-trimethylpentanol, which evolved during the alcoholysis reaction, distilling slowly. After 10 hours of heating, the reaction temperature was 250° C. and 144 ml. of 2,2,4-trimethylpentanol had been collected. The pressure was then slowly reduced to maintain the distillation and the reaction temperature held at 250° C. After 13 hours, the pressure was 4 mm. of mercury and 253 ml. of 2,2,4-trimethylpentanol had distilled. The product was treated with 20 ml. of water and 10 g. of filter cel for 3 hours at 60° C., then filtered. The filtrate was dried by heating at 0.5 mm. of mercury and 110° C. for 1 hour. This final product had a molecular weight of 1622 and a hydroxyl number of 0.53.

The following table lists compositions which have been prepared by the method of Example 1 (method A) or Example 3 (method B) and illustrates the use of various combinations of dicarboxylic acids, monofunctional alcohols and 1,4-cyclohexanedimethanol of various isomer content.

| Example | Method | Isomer Content of 1,4-CHDM | Dibasic Acid | Monofunctional Alcohol |
|---|---|---|---|---|
| 4 | A | 75% cis | Adipic | 2-Ethylhexanol. |
| 5 | A | 75% cis | Sebacic | Do. |
| 6 | A | 75% cis | do | 2,2,4-Trimethylpentanol. |
| 7 | A | 50% cis | Glutaric | n-Nonanol. |
| 8 | A | 75% cis | Pimelic | 2-Ethylhexanol. |
| | | | | Ester |
| 9 | B | 75% trans | | bis 2-Ethylhexyl isosebacate. |
| 10 | B | 75% trans | | bis 2-Ethylhexyl 2-ethyl-3-methylglutarate. |

*Example 11*

This example illustrates the preparation of an unterminated polymeric plasticizer. A flask equipped with stirrer and thermometer was charged with 412 g. (1.0 mole) of 2,2,4-trimethylpentyl azelate, 173 g. (1.2 moles) of 1,4-cyclohexanedimethanol, and 0.4 ml. of titanium tetraisopropoxide. The mixture was stirred and heated under nitrogen for 4 hours at 220° C. During this time 250 ml. of 2,2,4-trimethylpentanol distilled. The temperature was then raised to 250° C. and the pressure reduced to 0.3 mm. of mercury for 1 hour. The product was a low-molecular-weight polyester generally termed an unterminated polyester. This term indicates that the polymer chain is terminated by a hydroxyl group rather than an alkyl group as is the case in a terminated polyester. The particular product of Example 11 had a molecular weight of 1550 and a hydroxyl number of 62.

The vast variety of similar polymers which can be prepared is apparent. Generally these have molecular weights of 800 to 4000 and are useful for the various purposes mentioned above. Those in the range of 800 to 2500 are especially useful as polymeric plasticizers.

As is well known, plasticizers are added to polymers so that the molded articles will possess improved properties, such as increased flexibility, reduced sensitivity to crazing under stress, greater resistance to shattering under impact, etc. It is of extreme importance that the plasticizer remain dispersed within the plastic and not disappear through exudation, degradation, or extraction. The polymeric plasticizers described in this invention are superior in this respect to the well-known commercial plasticizers such as dioctyl phthalate.

First, the subject plasticizers possess hydrolytic stabilities superior to that of plasticizers made with other diols. Consequently, plasticized objects on exposure to humid atmospheres or in frequent contact with water retain those properties imparted by the plasticizer for a longer time when the subject plasticizers are used than when plasticizers based on a different diol are used.

Second, the subject plasticizers are more soluble in the plastic than DOP. As a result, loss of the plasticizer through extraction or exudation is minimized. The resistance to extraction is indicated in the following table by the lower values of heptane extraction and activated carbon loss in column A as compared with columns B and C. The resistance to exudation is indicated by the higher value of retained elongation in column A as compared with B and C; that is, under the conditions of the test (heating sample at 120° C. for 7 days) the DOP plasticizer exudes and consequently the flexibility of the sample falls, leading to low values of retained elongation. However, the subject plasticizers remain in the plastic and the elongation remains unchanged.

PROPERTIES OF PLASTICIZED POLY (VINYL CHLORIDE)

(A) Polyester [1] of azelaic acid-1,4-cyclohexanedimethanol-2-ethylhexanol
(B) Mixture of 75% A plus 25% DOP
(C) Dioctyl phthalate (DOP)

| | A | B | C |
|---|---|---|---|
| Parts per 100 | 50 | 55 | 50 |
| Tensile strength, p.s.i | 3,000 | 2,650 | 3,000 |
| Elongation, percent | 320 | 375 | 330 |
| 100% Modulus | 1,850 | 1,250 | 1,500 |
| Tear resistance, p.p.i | 495 | 355 | 320 |
| Durometer hardness, 5 sec | 86 | 76 | 84 |
| Activated carbon loss, percent | 0.3 | 0.7 | 1.5 |
| Retained elongation, percent (7 days at 120° C.) | 100 | 88 | 50 |
| 135,000 p.s.i. Modulus (° C.) | −30 | −38 | −37 |
| Heptane extraction, percent | 8.0 | 15.0 | 24 |

[1] Prepared as described in Example 1.

The polymers of this invention have various utilities over the range of molecular weights from 800 to 8000 as lubricants for special purposes which are characterized by exceptional stability under conditions of high temperature and other adverse factors, e.g. in jet engines, rocket accessories, etc.

Although the invention has been described in considerable detail with reference to certain preferred embodiments thereof, it will be understood that variations and modifications can be effected without departing from the spirit and scope of the invention as defined in the appended claims.

We claim:

1. Linear chain-terminated condensation polymers of (A) at least one dibasic dicarboxylic acid, (B) at least one bifunctional dihydroxy compound, and (C) at least one member having no amino substituent selected from the group consisting of monobasic monocarboxylic acids and monohydric alcohols, the relative proportions of (A), (B) and (C) constituents being such as to constitute a polymer having a molecular weight of from about 800 to 4,000 in which at least 50 mole percent of said constituent (B) consists of at least one member selected from the group consisting of the cis and transisomers of 1,4-cyclohexanedimethanol.

2. A polymer as defined by claim 1 wherein the constituents are: (A) is azelaic acid, (B) is 1,4-cyclohexanedimethanol, and (C) is 2-ethylhexanol.

3. A polymer as defined by claim 1 wherein the constituents are: (A) is azelaic acid, (B) is 1,4-cyclohexanedimethanol, and (C) is 2,2,4-trimethylpentanol.

4. A polymer as defined by claim 1 wherein the constituents are: (A) is adipic acid, (B) is 1,4-cyclohexanedimethanol, and (C) is 2-ethylhexanol.

5. A polymer as defined by claim 1 wherein the constituents are: (A) is sebacic acid, (B) is 1,4-cyclohexanedimethanol, and (C) is 2-ethylhexanol.

6. A linear polyester melting below 100° C. having a molecular weight of 800 to 4000 wherein the constituents are: (A) at least one dicarboxylic acid having from 4 to 40 carbon atoms and (B) at least one dihydroxy compound having from 2 to 40 atoms of which at least 50 mole percent is 1,4-cyclohexanedimethanol.

7. A polyester as defined by claim 6 wherein constituent (B) is entirely 1,4-cyclohexanedimethanol.

8. A polyester as defined by claim 7 having a molecular weight of from 800 to 2500 wherein constituent (A) is an aliphatic dicarboxylic acid.

9. A polyester as defined by claim 8 wherein constituent (A) is azelaic acid.

10. Plasticized polyvinyl chloride containing a polymer as defined by claim 1.

11. Plasticized polyvinyl chloride containing a polymer as defined by claim 2.

12. Plasticized polyvinyl chloride containing a polymer as defined by claim 3.

13. Plasticized polyvinyl chloride containing a polymer as defined by claim 4.

14. Plasticized polyvinyl chloride containing a polymer as defined by claim 5.

15. Plasticized polyvinyl chloride containing a polymer as defined by claim 6.

16. Plasticized polyvinyl chloride containing a polymer as defined by claim 7.

17. Plasticized polyvinyl chloride containing a polymer as defined by claim 8.

18. Plasticized polyvinyl chloride containing a polymer as defined by claim 9.

References Cited in the file of this patent

UNITED STATES PATENTS

| | | |
|---|---|---|
| 2,048,774 | Bolton | July 28, 1936 |
| 2,647,099 | Smith | July 28, 1953 |
| 2,897,176 | Rocky et al. | July 28, 1959 |
| 2,901,466 | Kibler et al. | Aug. 25, 1959 |

UNITED STATES PATENT OFFICE
CERTIFICATE OF CORRECTION

Patent No. 3,049,506                      August 14, 1962

Charles J. Kibler et al.

It is hereby certified that error appears in the above numbered patent requiring correction and that the said Letters Patent should read as corrected below.

Column 7, line 32, after "40" insert -- carbon --.

Signed and sealed this 26th day of February 1963.

(SEAL)
Attest:

ESTON G. JOHNSON                              DAVID L. LADD
Attesting Officer                                 Commissioner of Patents